US007555547B2

(12) United States Patent
Singh et al.

(10) Patent No.: US 7,555,547 B2
(45) Date of Patent: Jun. 30, 2009

(54) SYSTEM AND METHOD FOR IDENTIFYING NETWORK COMMUNICATIONS OF A PRIORITY SERVICE AMONG A PLURALITY OF SERVICES

(75) Inventors: Vebhhav Singh, Sunnyvale, CA (US); Veshaal Singh, Aligarh (IN); Nan Xie, San Mateo, CA (US)

(73) Assignee: Oracle International Corp., Redwood Shores, CA (US)

( * ) Notice: Subject to any disclaimer, the term of this patent is extended or adjusted under 35 U.S.C. 154(b) by 1074 days.

(21) Appl. No.: 10/788,085

(22) Filed: Feb. 26, 2004

(65) Prior Publication Data

US 2005/0190692 A1    Sep. 1, 2005

(51) Int. Cl.
G06F 15/173    (2006.01)
(52) U.S. Cl. .................. 709/224; 709/201; 709/226; 709/228; 709/232; 718/100; 719/317
(58) Field of Classification Search ......... 709/223–224, 709/226–229, 232, 201; 718/100; 719/310, 719/317
See application file for complete search history.

(56) References Cited

U.S. PATENT DOCUMENTS

| 5,699,521 | A | 12/1997 | Lizuka et al. |
| 6,223,201 | B1 * | 4/2001 | Reznak .................. 718/102 |
| 6,286,052 | B1 | 9/2001 | McCloghrie et al. |
| 6,735,169 | B1 * | 5/2004 | Albert et al. ............... 370/229 |
| 6,795,860 | B1 * | 9/2004 | Shah ........................ 709/229 |
| 6,823,056 | B1 * | 11/2004 | Hussain .................. 379/207.02 |
| 6,839,757 | B1 * | 1/2005 | Romano et al. ............ 709/226 |
| 7,082,471 | B2 * | 7/2006 | Hericourt .................. 709/232 |
| 7,086,064 | B1 * | 8/2006 | Stevens .................... 719/310 |
| 7,120,442 | B2 * | 10/2006 | Kim et al. ................. 455/450 |
| 7,216,160 | B2 * | 5/2007 | Chintalapati et al. ........ 709/224 |
| 7,376,955 | B1 * | 5/2008 | Forman .................... 719/310 |
| 2003/0023661 | A1 * | 1/2003 | Clohessy et al. ............ 709/104 |
| 2003/0061257 | A1 * | 3/2003 | Cardona ................... 709/102 |
| 2004/0226013 | A1 * | 11/2004 | Mariotti et al. ............. 718/100 |
| 2007/0143449 | A1 * | 6/2007 | Wray West et al. |

FOREIGN PATENT DOCUMENTS

JP    10232851 A  *  9/1998

OTHER PUBLICATIONS

USPTO Non-Final Office Action in co-pending U.S. Appl. No. 10/787,995, filed Feb. 26, 2004, having a mailing date of Sep. 16, 2008.
U.S. Office Action in co-pending U.S. Appl. No. 10/787,995, and entitled "System and Method of Dynamically Providing Priority for Network Communications" having a date of mailing of Feb. 18, 2009.

* cited by examiner

*Primary Examiner*—Oanh Duong
(74) *Attorney, Agent, or Firm*—Kraguljac & Kalnay LLC

(57) ABSTRACT

Systems, methodologies, media, and other embodiments associated with identifying network communications of services are described. One example system embodiment includes a service identification logic configured to monitor execution of software of an application server and identify services being processed. The service identification logic can further include a logic configured to identify network communications associated with an identified service. The example system may also include a notification logic configured to notify one or more network devices to provide priority processing for the network communications associated with the identified service.

25 Claims, 5 Drawing Sheets

SYSTEM AND METHOD FOR IDENTIFYING NETWORK COMMUNICATIONS OF A PRIORITY SERVICE AMONG A PLURALITY OF SERVICES

CROSS REFERENCE TO RELATED APPLICATION

This application is related to U.S. patent application entitled "System and Method of Dynamically Providing Priority For Network Communications", Ser. No. 10/787,995 filed Feb. 26, 2004, inventor: Singh et al., which is also assigned to the present assignee.

BACKGROUND

Software applications and application servers may typically include many different applications and services within those applications (e.g. services configured as software modules or other forms) that can be invoked and executed. When a service is invoked, it may in turn invoke the execution of other internal services. Each service may generate network calls such as a database call, an external application call, and other types of network communications that generate network traffic. In prior systems, the network communications coming from a selected application server could be given priority processing where the priority was given to the application server as a whole. However, providing priority or other special processing to a particular service within the application server was not performed. One reason is that network communications at a service-level could not be identified between different services of the same application server/software. Relationships between services at run-time (e.g. what services and/or how many services are being called in a stack) may also be useful.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
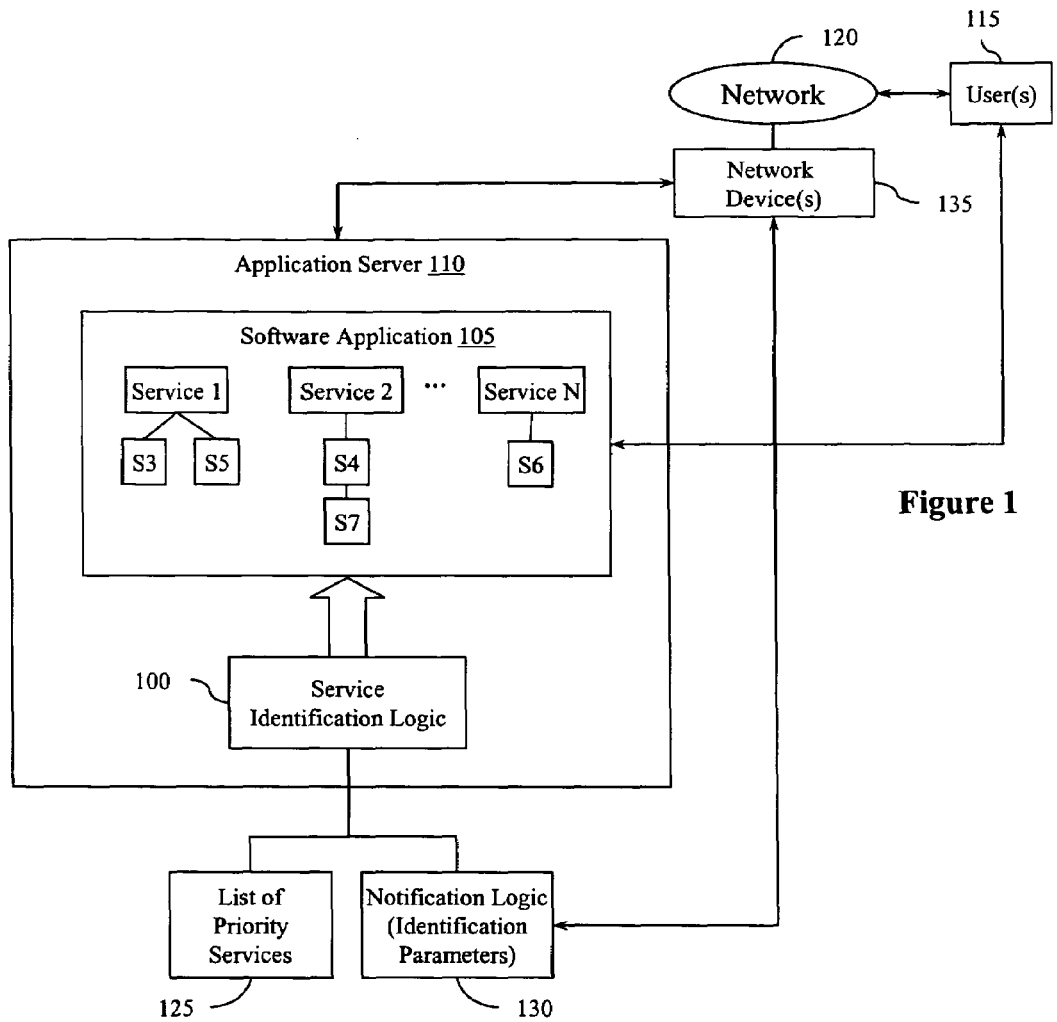
FIG. 1 illustrates an example system for identifying a service within an application server.

A software application may include any number of services that are configured to perform a variety of functions. A service can be configured as a software module, routine, or other type of software component that is configured to perform a desired function. One example service may be a purchase order generator that, as the name implies, generates purchase orders for a transaction. When the purchase order generator service is invoked and executed, it may generate any number of network calls that result in network communications (e.g. TCP/IP network traffic). The network calls can be, for example, a database call, a lightweight directory access protocol (LDAP) call, an external application call like a credit card validation, and so on. These types of network-oriented transactions generate network communications and network traffic. In order to provide special processing for the purchase order generator service or other selected service, the network communications generated by or associated with the purchase order generator need to be identified. One type of special processing may include prioritizing the network communications so that they can be processed with priority over other network communications, even given priority over other communications from the same software application.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Illustrated in FIG. 1 is one example of a service identification logic 100 that can be configured to identify services and identify network communications associated with a service. As will be explained, the identification can be performed external to an executing software so that modifications to the code of the software can be avoided. In the illustrated example, the service identification logic 100 can be configured to monitor software 105 to identify services therein. The software 105 may be executed, for example, by or as part of an application server 110, which may be executing multiple software applications. The software 105 can include one or more services (e.g. services 1-N) that can be invoked and processed, and each service 1-N may invoke other internal services S3-S7. At run-time, relationships between services may be created that can logically be represented as a tree, a stack, or other structure based on which services are invoked by a service (e.g. service S3 and S5 are invoked by Service 1).

In one example, the application server 110 can be a server program in a computer or in a distributed network that provides business logic for the software application 105. The application server 110 can include a suite of software that helps programmers isolate the business logic in the application from the platform-related code. The application server 110 can also be configured to handle the application logic and connectivity found in client-server applications and can offer features such as transaction management, clustering and failover, load balancing, open database connectivity (ODBC) support, and other features.

In general, an application server can be configured to range from a small footprint, using web-based processors for intelligent applications or remote embedded devices, to complete environments for assembling, deploying, and maintaining scalable multi-tier applications across an enterprise. The application server 110 can be configured to handle application operations between browser-based computers (e.g. one or more clients/users 115) and an organization's back-end business applications and/or databases. For example, the user 115 can access a network 120 such as the Internet and can establish an operable connection with the application server 110 to establish communications between them. Any type of computer communication can be used. The application server 110 can act as a translator allowing the client 115 to, for example, search an on-line database, to purchase products, and/or to perform other available on-line operations or services.

In the following example, assume that a purchase order generator service is identified as a priority service. Further assume that the service identification logic 100 is configured to identify the network communications associated with the purchase order generator so that the network communications can receive priority processing. Although network communications and other operations may be distinguishable between two different software applications and/or application servers, network communications between two different internal services (e.g. purchasing modules, invoicing modules, and others) of the software application 105 are not readily distinguishable. For example in FIG. 1, Service 1 and Service 2 represent different internal services from the same application 105. However, before a particular network communication can be identified, the selected service (e.g. the purchase order generator service) needs to be identified from other services being processed within the application server 110.

Thus, in one example, the service identification logic 100 is configured to monitor the execution of the software application 105 and to identify the executing code associated with the priority service (e.g. the purchase order generator). Once the priority service is identified, then the service identification logic 100 can identify network communications that are generated by and/or associated with the priority service. As one example, the service identification logic 100 can be embodied as software that is independent and external to the software application 105 so that the code of the software application 105 does not need to be changed. The service identification logic 100 can be executed concurrently with the software application 105 and can monitor events that occur within the software application 105 through features or other operations available through the application server 110, an operating system, and/or other tools available in the computing environment.

From the monitoring, the name of a service being processed can be identified by the service identification logic 100 and can be compared to a list of priority services 125. The list of priority services 125 may include one or more service names that have been previously selected for priority processing. If the service identified is a priority service, a notification logic 130 can be configured to notify one or more network devices 135 to provide priority processing for the network communications associated with the identified service. For example, one or more identification parameters can be identified from the network communications of the priority service and the identification parameters can then be transmitted to the network devices 135. Additionally, relationships between the services (at run-time) can be determined by identifying the services that are invoked by another service. Thus, from monitoring the execution of the application 105, the service identification logic 100 can be configured to determine and build the relationships of services. For example, Service 1 has invoked services S3 and S5, and thus are related (e.g. S3 and S5 are child services of Service 1). Knowing the relationships can allow the system to automatically provide priority to all child-services of a priority service, if so desired.

The list of priority services 125 can be pre-generated based on selections made by a user (e.g. a system administrator). In that regard, a logic can be provided (not shown) that is configured to determine installed services within the software application 105 and allow a user to select which services are to be given priority processing. The list of priority services 125 can then be generated from the services selected from the installed services. This feature will be described in greater detail with reference to FIGS. 5 and 6, for example.

In another example, the service identification logic 100 can be configured to identify network communications of a selected service by monitoring for a socket allocated to the selected service. The socket will typically be assigned a network tuple needed to make a physical network connection and facilitate network communications. The network tuple may include a source Internet Protocol (IP) address and port, and a target IP address and port. Thus, in one example, data from the network tuple associated with the socket can be used to identify the network communications of a service. Once a service is identified as a priority service, it can be further monitored for an occurrence of a socket allocation. Since a socket is a mechanism for creating a virtual communication connection between processes or other objects, the opening of a socket indicates that network communication will occur. The network tuple will form part of an Internet protocol (IP) packet and will be used to direct the communications between a source object (e.g. the identified service) and a target object over the network (e.g. the user 115). The IP packet can include four address components, for example, a source IP address, a source port value, a target IP address, and a target port value. The IP packet can be transmitted to the network device 135 that can translate the IP packet and send it through the network 120 to the appropriate target.

Each IP packet can be uniquely identified using the four address components. Furthermore, each service processed by the application server 110 will be dynamically assigned a unique source port value when a socket is allocated for the service. Thus in one example, once a socket is identified, the source port value can be retrieved for that socket and the source port value can be used to identify network communications associated with that socket and thus, that selected service. The notification logic 130 can then transmit the source port value to the network device 135 along with instructions to prioritize network communications associated with the selected service. The instructions can cause the network devices 135 to monitor network communications (e.g. IP packets) that include the identified source port value and mark those packets for priority processing. Thus, the network devices 135, at a hardware level, may at least identify and mark selected network communications that are processed through the network device 135 associated with the priority service based on at least the source port value.

Figure 2:
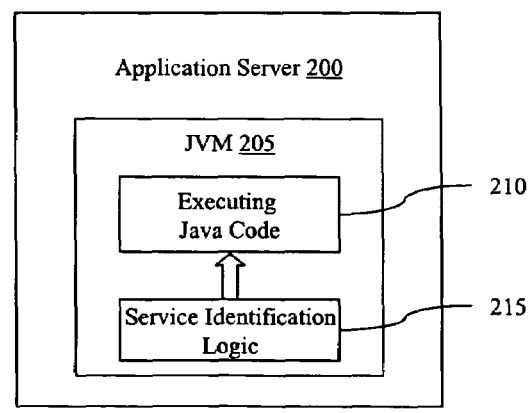
FIG. 2 illustrates another example system configuration relating to a Java platform.

Illustrated in FIG. 2 is an example component configuration of a system for identifying network communications from an application server 200. The example configuration is a Java-based environment where the application server 200 uses a Java virtual machine (JVM) 205 to process code from a software application. When a service is invoked from the application server 200, a thread is allocated to process the code within the JVM 205. The processing code is shown as executing code 210. As the executing code 210 is processed within the JVM 205, a service identification logic code 215 can be concurrently executing within the JVM 205. The JVM 205 and the service identification logic 215 can be operably connected to allow the identification logic 215 to obtain run-time execution data associated with the executing code 210.

For example, the service identification logic code 215 can be configured to monitor events associated with the executing code 210 in order to identify and determine whether the executing code 210 is associated with a priority service or not, as described previously. This can be performed by listening to events generated by the JVM 205. Thus, the service identification logic code 215 can be independent and non-intrusive to the executing code 210. Based on the monitored events, the service identification logic code 215 can determine whether the executing code 210 is a priority service and, if so, monitor for an allocation of a socket. As explained previously, a source port value assigned to the socket can then be retrieved and used to identify network communications associated with this socket and, thus, this service. Other portions of the source address assigned to the socket can also be used to identity the network communications.

Figure 3:
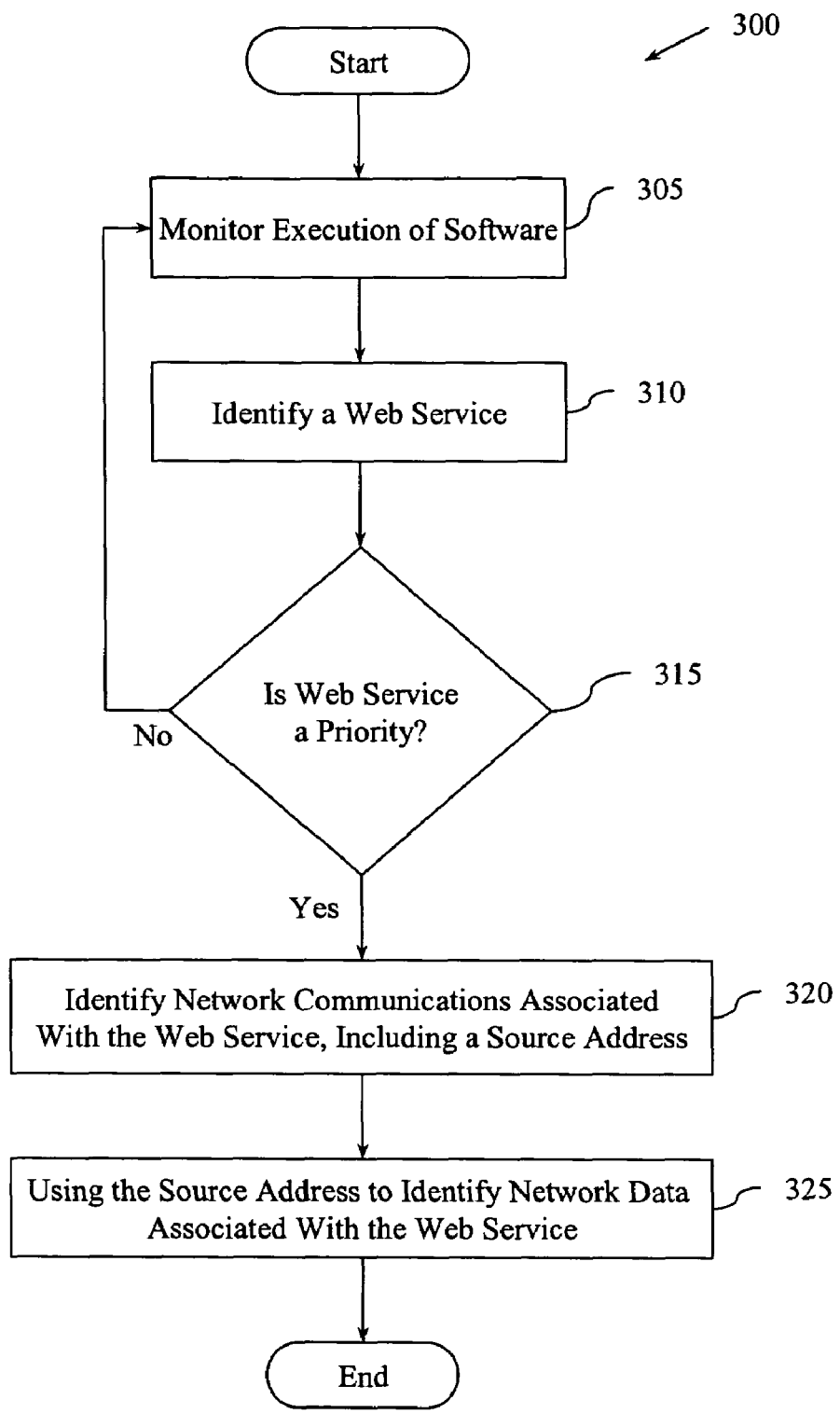
FIG. 3 illustrates an example methodology associated with identifying a service and network communications.
Figure 4:
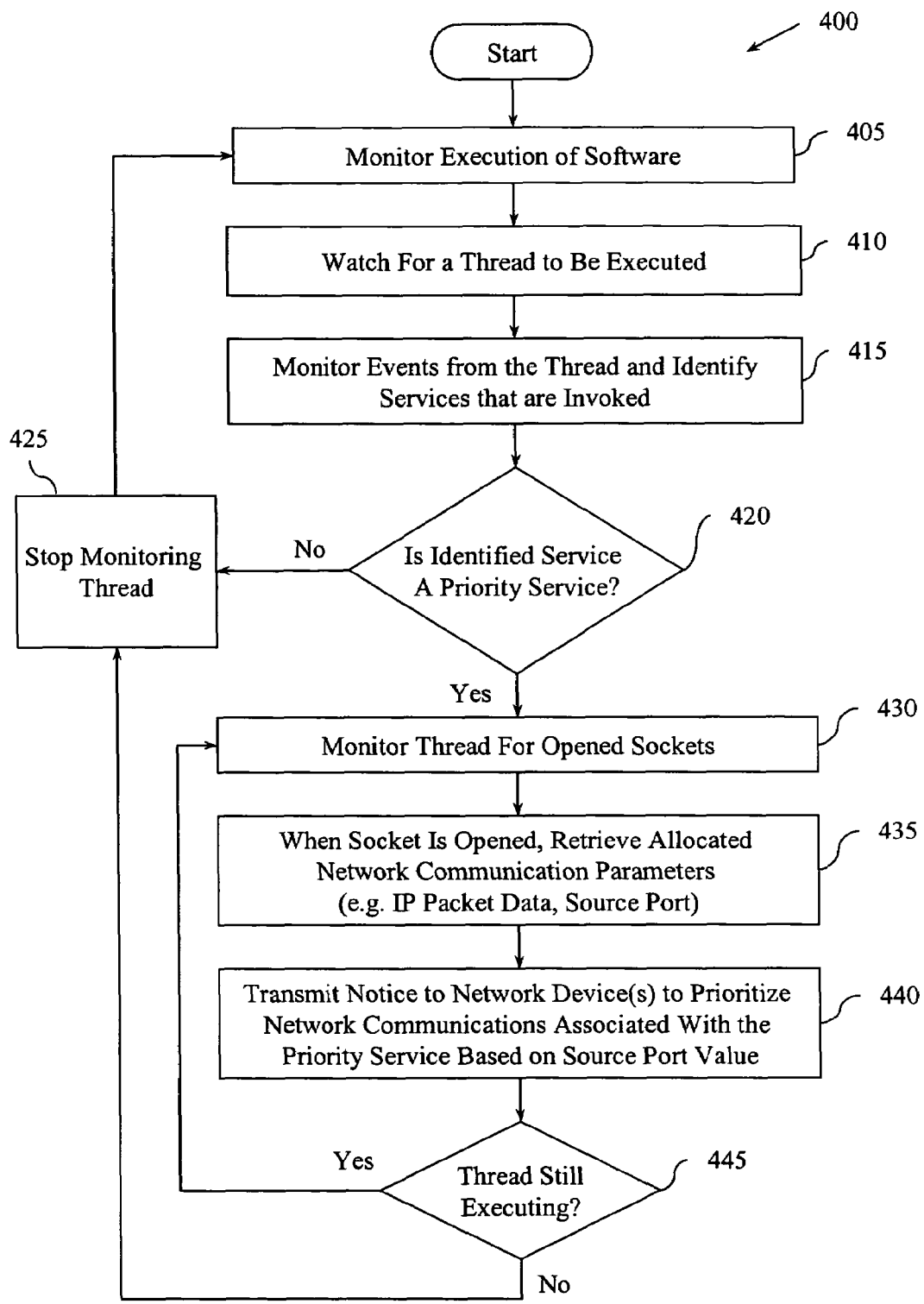
FIG. 4 illustrates another example methodology associated with identifying network communications of a service.

Example methods may be better appreciated with reference to the flow diagrams of FIGS. 3 and 4. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques. The foregoing applies to all methodologies herein.

Illustrated in FIG. 3 is an example methodology 300 associated with identifying a service from an application server/software application and identifying network communications associated therewith. In the example, it is presumed that the application server can process many different types of services that are provided by the software. One type of service can be a web service that generates network communications and/or causes network communications to occur as part of its operation. The methodology 300 can be initiated in response to any desired event such as the execution of the software. The execution of the software can be monitored (block 305) to determine identification information that may indicate what service is being process. Based on the monitoring, the methodology can identify the service being processed (block 310). For example, the process can determine if the service is a web service that performs network communications.

At block 315, it is determined whether the web service is a priority service. In one example, this can be performed by comparing the name or other identification of the web service to a predefined list of priority services. If the web service is not a priority service, the process can stop monitoring that service and continue monitoring the execution of the software for the next service that is processed (block 305).

If the web service is a priority service (block 315), network communications associated with the web service are identified (block 320). This may include determining identification information/parameters that can uniquely associate the network communications with the web service. For example, if the network communications are processed using a socket connection, a network tuple may be allocated to the socket connection. In one example, the network tuple may include four components like a source IP address, a source port value, a target IP address, an a target port value that become part of an IP packet. Some portion or all of the network tuple components can be used to identify the network communications of the web service.

For example, the source port value can be dynamically allocated for a socket by the application server and is uniquely associated to the web service and the socket. Since every IP packet that is associated with the web service and its current socket will include the same source port value, it may be used to identify the network communications (e.g. IP packets) associated with the web service (block 325). At least the source port value, for example, can be used by network devices (e.g. routers, traffic shapers, and the like) to monitor network communications as they are being processed to determine which network communications match the source port value.

FIG. 4 illustrates another example methodology 400 associated with identifying a service from an application server/software application and identifying network communications associated therewith. In the following example, the process will refer to computer-implemented processing based on a Java platform where an application server processes software code using a Java virtual machine and where a thread is used to process a service/module that is invoked within the software.

The process can begin by monitoring the execution of the software (block 405). For example, the process can listen to or monitor for events that occur within the Java virtual machine during execution of the software. This type of information can be retrieved from, for example, a run-time memory. In this manner, the monitoring is external to the software and does not interfere with its processing. The process watches/monitors for a thread to be executed (block 410). For example, when an event occurs in response to a thread being allocated, it can be assumed that a new service/module is being invoked and processed. Events that are triggered by the thread are monitored (block 415) to identify what is being processed by the thread. By reviewing information/parameters from the events such as class names, the identity of the service being processed can be determined.

At block 420, a determination is made whether the identified service associated with the thread is a priority service. For example, class names associated with events can be determined where a class name can be used to identify the service being processed. If a class name identified from the thread matches a class name of a priority service, then the process knows that the thread is processing a priority service. A list of priority services, including their class names, can be maintained and used for this determination. If the service identified is not a priority service, then monitoring of the thread is stopped since it is processing a non-priority service (block 425). The process can continue monitoring the execution of the software for new threads that are allocated (block 405).

If a priority service is being processed by the thread at block 420, then the process continues to monitor the execution of the thread. For example, the process can monitor for events associated with a socket being opened or otherwise allocated to the thread (block 430). As explained previously, a socket can be used for network communications. Thus, when an event indicates that a socket is opened, the process knows that the thread will be performing network communications. In other words, the service is a web service. When the socket is opened, network communication parameters, which are allocated to the socket, are retrieved (block 435). This can include IP packet data, a source port value, and/or other values as desired.

In one example, the source port value is dynamically assigned to a socket when the socket is opened. Different services being concurrently processed by the application server will perform network communications through different sockets where each socket is only assigned to one service. Although two different services may have the same source IP address since the services are part of the same application server, the different services will be assigned different source port values for their respectively assigned sockets. The source port value can, thus, be used to identify the service that is using the socket and can identify the network communications that are processed through the socket. This is because the network communications coming from a service will have the same source port value in each IP packet.

Once the source port value is determined for a priority service, a notice can be transmitted to one or more network devices that process network traffic (block 440). The notice can be a data packet or other signal transmission that includes at least the source port value. The network device(s) can then use the source port value to mark all network traffic having the same source port value as priority network traffic. In this manner, the network communications associated with the priority service can receive priority processing based on the source port value.

With further reference to FIG. 4, after the priority service is identified and the notice is transmitted, the process can continue to monitor the thread if it is still executing (block 445, 430). If the thread ends (block 445), the process stops monitoring the thread (block 425) and can resume monitoring the execution of the software for new threads (block 405). Of course, the process can be configured to monitor multiple threads concurrently.

In this example, at least the source port value is the mechanism used to identify network communications that are associated with a priority service. This allows the network communications to be marked and processed with priority. However, once the identify of the service is determined, any type of special processing can be initiated for the service besides or in addition to giving it priority processing.

Figure 5:
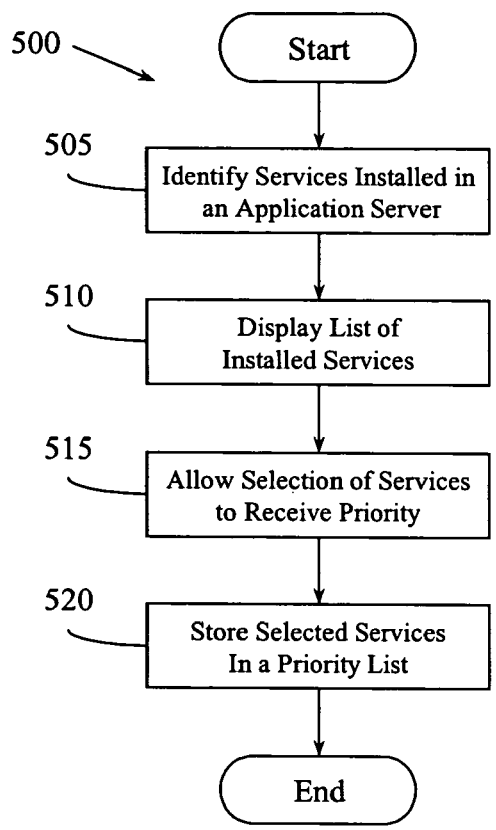
FIG. 5 illustrates an example methodology associated with selecting a service for priority.

Illustrated in FIG. 5 is one example methodology 500 associated with allowing a user to select one or more available services for priority processing. For example, the methodology 500 can be employed with a graphical user interface. At block 505, the process identifies services that are installed in an application server. This can be performed, for example, be reading configuration files of the application server like a web.xml file. Typically, J2EE compliant systems include web.xml files that identity services that are installed. The process can also determined what classes have been defined in the application server. Each service can have an associated class name that can be read. By using one or both of these identification methods, names of the installed services can be stored in a list or other desired data store for later use. It will be appreciated that processing block 505 can be optional. For example, the identification of installed services may be predetermined and thus performed separate from the other processing blocks of FIG. 5. The list of installed services may also be simply provided by an application server so that the identification step need not be performed.

In any event, the process of FIG. 5 can be initiated in response to a user (e.g. system administrator) desiring to assign priority network processing to one or more selected services. If the list of installed services is available, the list is displayed (block 510). If the list is not available, block 505 can be initiated to generate the list. The process can then allow the user to select one or more installed services to receive priority (block 515) and to store the selected services in a list of priority services or any type of data store (block 520). The generated priority list can be used, for example, as the list of priority services 125 of FIG. 1.

Figure 6:
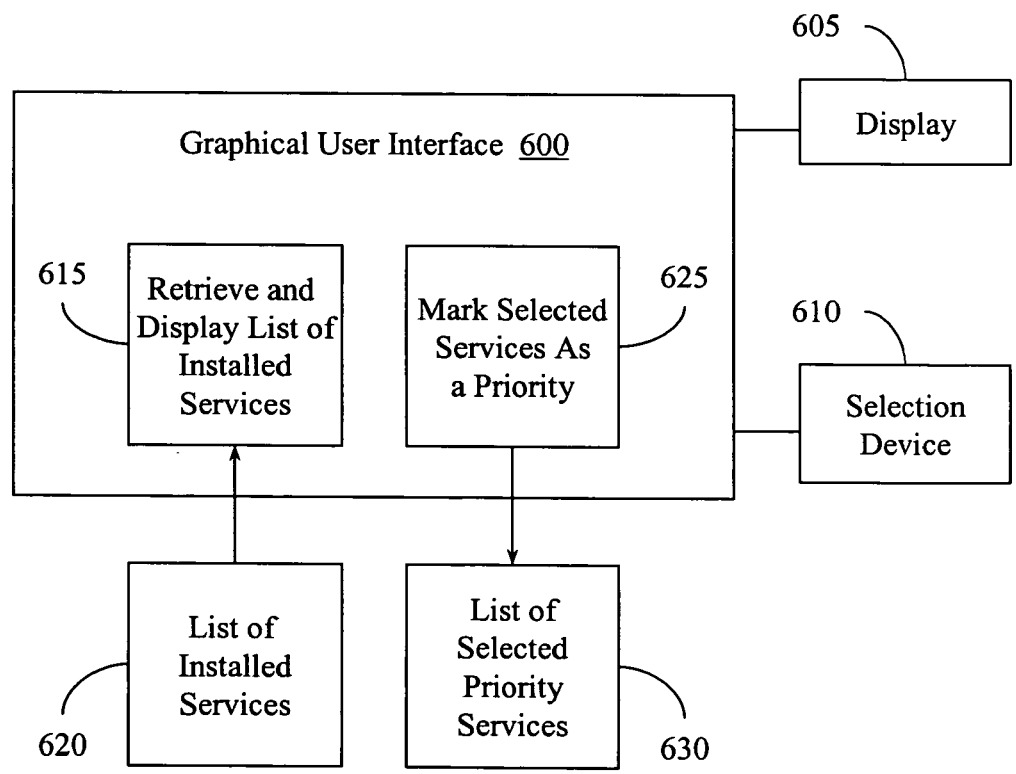
FIG. 6 illustrates an example graphical user interface associated with selecting a service for priority.

With reference to FIG. 6, an example graphical user interface 600 is illustrated that can be configured to perform the method of FIG. 5 on a computer system. An example computer system can include at least a display 605 and a selection device 610 that can interface and operate with the graphical user interface 600. The graphical user interface 600 can be embodied as software on a computer-readable medium having processor executable instructions operable to perform a method of providing and selecting from a set of data entries on the display 605 to select services for priority. Executable instructions 615 can cause the computer to retrieve a set of data entries, where a data entry represents a service that is installed on an application server. For example, identification data representing the installed services can be read from a list of installed services 620 as previously described. The set of data entries representing the installed services can then be caused to be displayed on the display 605.

Executable instructions 625 can cause the computer to respond to one or more data entry selection signals that are received indicative of the selection device 610 selecting one or more data entries from the set of data entries displayed (e.g. clicking on and selecting a displayed service). The selected services can be marked as priority services. In response to the one or more data entry selection signals, one or more entries can be caused to be stored in a list of priority services 630 where an entry represents a service selected to receive priority processing. The generated list 630 can be used, for example, as the list of priority services 125 of FIG. 1. The graphical user interface 600 can also be configured to allow a user to modify the list of selected priority services 630 after the list has been generated.

The graphical user interface 600 can also include processor executable instructions to cause a processor to provide an option to initiate identification of installed services in the application server. In the case where the list of installed services 620 is not generated, the user can select the option to initiate the identification. In response to the option being selected, the graphical user interface 600 can cause logic (not shown) to identify the installed services in the application server.

Figure 7:
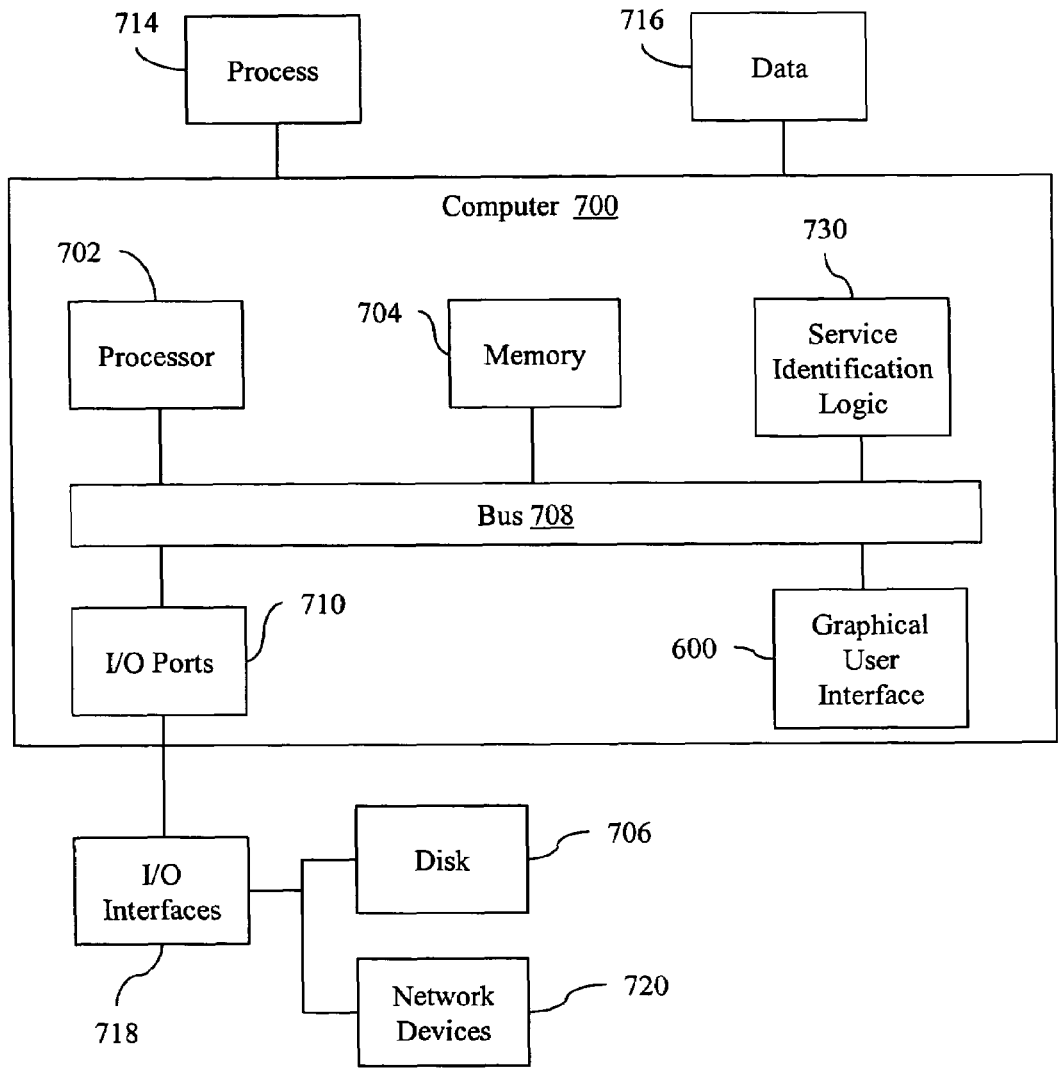
FIG. 7 illustrates an example computing environment in which example systems and methods illustrated herein can operate.

FIG. 7 illustrates an example computer system 700 that includes a processor 702, a memory 704, and input/output ports 710 operably connected by a bus 708. In one example, the computer 700 may include a service identification logic 730 configured to facilitate identification of services within an application server/software as previously described. For example, the service identification logic 730 can be configured similar to the service identification logic 100 described in FIG. 1 and/or with systems and methods of FIGS. 2-4. The computer 700 can also include the graphical user interface 600 as described with reference to FIG. 6.

Generally describing an example configuration of the computer 700, the processor 702 can be a variety of various processors including dual microprocessor and other multi-processor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, devices like a magnetic disk drive, a solid state disk drive, a floppy disk drive, a tape drive, a Zip drive, a flash memory card, and/or a memory stick. Furthermore, the disk 706 can include optical drives like a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via I/O interfaces 718 and input/output ports 710. Input/output devices can include, but are not limited to, a keyboard, a microphone, a pointing and selection device, cameras, video cards, displays, disk 706, network devices 720, and the like. The input/output ports 710 can include but are not limited to, serial ports, parallel ports, and USB ports.

The computer 700 can operate in a network environment and thus may be connected to network devices 720 via the I/O devices/interfaces 718, and/or the I/O ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 720 can connect to WAN technologies including, but not limited to, point to point links, circuit switching networks like integrated services digital networks (ISDN), packet switching networks, and digital subscriber lines (DSL).

Figure 8:
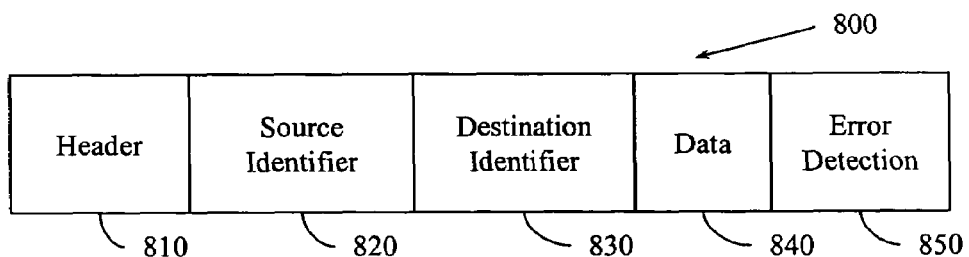
FIG. 8 illustrates an example data packet.

Referring now to FIG. 8, information can be transmitted between various computer components and/or logics associated with providing notice, or otherwise, priority identification data of a priority service as described herein via a data packet 800. The data packet 800 can be transmitted to one or more network devices like routers, network traffic shapers, and the like as described in previous examples. It will be appreciated that the illustrated fields of the data packet 800 may change in accordance with the communication protocol being used. In one example, the data packet 800 can include a header field 810 that includes information like the length and type of packet. A source identifier 820 follows the header field 810 and includes, for example, an address of the computer component and/or logic from which the data packet 800 originated. Following the source identifier 820, the data packet 800 includes a destination identifier 830 that holds, for example, an address of the computer component and/or logic to which the packet 800 is ultimately destined. Source and destination identifiers can be, for example, a globally unique identifier (GUID), a uniform resource locator (URLs), a path name, and the like.

A data field 840 in the packet 800 can include various information intended for the receiving computer component and/or logic (e.g. a router). In one example, the data field 840 can include priority identification data like a source port value of a selected service that is to receive priority. As explained previously, the source port value can be used by a router to identify network communications processed by the router. If a network communication (e.g. an IP packet) has a source port value that matches the source port value from the data field 840, then the network communication is associated with the priority service. The data field 840 can also include instructions that tell the network device what to do with the identified network communications such as mark it for priority processing.

In this manner, the data packet 800 can be configured for transmitting priority identification data to one or more network devices. The data field 840 can be configured with one or more sub-fields like a first field that stores the instructions to the network device and a second field that stores the identification data (e.g. source port value). For example, the first field can be configured to store instructions to mark selected network communications for priority processing where the selected network communications are associated with a priority web service. The second field stores a unique identifier allocated to network communications associated with the priority web service where the unique identifier can be used by the one or more network devices to identify the selected network communications from network traffic being processed by the one or more network devices.

The data packet 800 can also include an error detecting and/or correcting field 850 where a computer component and/or logic can determine if it has properly received the packet 800. While five fields are illustrated in a certain order, it is to be appreciated that a greater and/or lesser number of fields arranged in different orders can be present in example data packets. It will be further appreciated that the data packet can be configured in a variety of forms such as at least one of: a computer-readable medium, a carrier wave, and one or more signals that can be propagated over a transmission medium.

With the above described systems and methods, the identify of different services installed on an application can be determined. A user can select any available service like a purchase order generator service and mark it to receive priority. All network communications that are generated by the selected service can then be identified and be given priority processing on an individual level rather than giving priority to all network communications generated by the application software from all installed services.

While the figures illustrate various actions occurring in serial, it is to be appreciated that various actions could occur substantially in parallel, can occur in different orders, and/or can occur at different points in time. Furthermore, while a certain number of processing blocks (e.g. processes) are described in each figure, it is to be appreciated that a greater and/or lesser number of processes could be employed and that lightweight processes, regular processes, threads, and other approaches could be employed.

In one example, the methodologies are implemented as processor executable instructions and/or operations that can be provided by a computer-readable medium. Thus, in one example, a computer-readable medium may store and/or provide processor executable instructions operable to perform one or more of the described methods.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system embedded in a computer readable medium, including instructions that when executed by one or more processors, for identifying network communications from a selected service being processed by an application server, the system comprising:
    a service identification logic configured to:
        monitor execution of software of an application server and identify services being processed and invoked by the software,
        monitor for threads that are executed by the software, and
        identify the selected service of the identified services as a priority service;
    the service identification logic further including:
        a logic configured to:
        identify the network communications associated with the selected service of the identified services by monitoring events from executing the threads and determining whether the events are associated to the selected service,
        if the events are associated to the selected service, monitor the thread for opened sockets,
        in response to a socket being opened, retrieve allocated network communication parameters assigned to the socket including a source port value; and
    a notification logic configured to notify one or more network devices to provide priority processing for the network communications associated with the selected service of the identified services based at least in part on the source port value.

2. The system of claim 1 where the one or more network devices include at least one of a router and a network traffic shaper.

3. The system of claim 1 where the service identification logic further includes a logic configured to determine whether the identified service is a priority service using a list of priority services.

4. The system of claim 3 further including logic configured to determine installed services that are installed in the application server, and to generate the list of priority services from services that are selected from the installed services.

5. The system of claim 1 where the service identification logic is configured to identify network communications by monitoring for a socket allocated to the identified service and using data from a network tuple associated with the socket to identify the network communications.

6. The system of claim 5 where the data from the network tuple includes a source port value.

7. The system of claim 6 where the notification logic is configured to transmit, to the one or more network devices, at least the source port value for identifying the network communications and instructions to prioritize the network communications.

8. The system of claim 1 where the service identification logic is configured as processor executable instructions capable of execution by a Java virtual machine.

9. The system of claim 1 where the service identification logic is configured as processor executable instructions that are non-intrusive to the software being executed by the application server.

10. The system of claim 1 where the system is embodied as a computer system, the computer system further including:
    at least one processor, memory, and input/output ports operably connected by a bus;
    an input/output interface configured to establish network communication with a network; and
    where the service identification logic is configured to monitor the software being executed by the at least one processor.

11. The system of claim 1 where the service identification logic includes means for identifying a service and means for identifying network communications associated with the service identified.

12. A computer-implemented method of identifying network communications from a selected service being processed by an application server, the method comprising:
    storing at the application server data that identifies the selected service as a priority service;
    monitoring an execution of software from the application server;
    monitoring for a thread that is executed by the software;

monitoring events that are triggered by the thread and determining whether the events are associated to the selected service among a plurality of services invoked by the software;

if the events are associated to the selected service, monitoring the thread for opened sockets;

in response to a socket being opened, retrieving allocated network communication parameters assigned to the socket including a source port value; and transmitting at least the source port value to one or more network devices to cause the one or more network devices to identify network communications associated to the selected service based on the source port value and to mark the network communications to be processed with priority.

13. The method of claim 12 where the network communication parameters include at least a source address, a destination address, a destination port value, and the source port value.

14. The method of claim 12 where the determining whether the events are associated to the selected service step includes determining a class name associated with the events and comparing the class name to a class name of the selected service.

15. The method of claim 12 where the transmitting step further includes transmitting instructions to prioritize the network communications associated to the selected service.

16. A computer-implemented method comprising:

monitoring, by a service identification logic of an application server, an execution of software being executed by the application server, wherein the software provides a plurality of services;

identifying a web service from the plurality of services that is initiated during the execution, where the identifying the web service step includes:

identifying an execution of a thread; and determining a class name processed by the thread, wherein the class name is associated to the web service;

determining whether the web service has been selected as a priority service;

if the web service is the priority service, identifying network communications associated with the web service, wherein each of the network communications includes a source address having a source port value; and transmitting at least the source address to one or more network devices to cause the network devices to identify network communications associated with the web service to allow the network communications to receive priority processing.

17. The method of claim 16 where the identifying a web service step includes identifying a plurality of web services and determining relationships between each of the plurality of web services.

18. The method of claim 16 where the determining step includes comparing the web service to a predetermined list of web services that have been selected as priority services.

19. The method of claim 16 where the identifying network communications step includes:

monitoring for sockets allocated for the web service where an allocated socket includes a network tuple to be used for network communication.

20. The method of claim 19 where the monitoring includes listening for an event associated with opening of a socket.

21. The method of claim 16 further including sending a notice to one or more network devices that the network communications associated with the web service should receive priority processing.

22. The method of claim 21 further including transmitting the source address to the one or more network devices to alert the one or more network devices that network communications associated with the source address has been selected for priority processing.

23. The method of claim 21 where the source address includes a source port value from a network tuple and where the notice includes, at least, the source port value, and instructions to mark selected network communications for priority processing where the selected network communications are associated with the source port value.

24. The method of claim 16 where the source address includes a source port value retrieved from a network tuple that has been assigned to a communication channel allocated to the web service for the network communication.

25. A computer-readable medium configured to provide processor executable instructions embedded therein and operable to perform a method, the method comprising:

monitoring an execution of software being executed by an application server, wherein the software provides a plurality of services;

identifying a web service of the plurality of services that is initiated during the execution, where the identifying the web service step includes:

identifying an execution of a thread; and determining a class name processed by the thread, wherein the class name is associated to the web service;

determining whether the web service has been selected as a priority service;

if the web service is the priority service, identifying network communications associated with the web service, wherein each of the network communications includes a source address having a source port value; and transmitting at least the source address to one or more network devices to cause the network devices to identify network communications associated with the web service to allow the network communications to receive priority processing from the one or more network devices.

* * * * *

UNITED STATES PATENT AND TRADEMARK OFFICE
CERTIFICATE OF CORRECTION

PATENT NO. : 7,555,547 B2 Page 1 of 1
APPLICATION NO. : 10/788085
DATED : June 30, 2009
INVENTOR(S) : Vebhhav Singh et al.

It is certified that error appears in the above-identified patent and that said Letters Patent is hereby corrected as shown below:

In column 8, line 21, delete "an" and insert -- and --, therefor.

Signed and Sealed this

Thirteenth Day of July, 2010

David J. Kappos
*Director of the United States Patent and Trademark Office*